US010773790B2

(12) United States Patent
Menard et al.

(10) Patent No.: US 10,773,790 B2
(45) Date of Patent: Sep. 15, 2020

(54) IMPACT RESISTANT DORSAL FIN

(71) Applicant: AIRBUS OPERATIONS S.L., Getafe (ES)

(72) Inventors: Edouard Menard, Getafe (ES); Esteban Martino González, Getafe (ES); Fernando Iniesta Lozano, Getafe (ES)

(73) Assignee: Airbus Operations S.L., Getafe (ES)

( * ) Notice: Subject to any disclaimer, the term of this patent is extended or adjusted under 35 U.S.C. 154(b) by 346 days.

(21) Appl. No.: 15/843,203

(22) Filed: Dec. 15, 2017

(65) Prior Publication Data

US 2018/0170520 A1 Jun. 21, 2018

(30) Foreign Application Priority Data

Dec. 19, 2016 (EP) .................................... 16382619

(51) Int. Cl.
*B64C 5/06* (2006.01)
*B64C 1/12* (2006.01)
*B64C 1/00* (2006.01)
*B64D 45/00* (2006.01)

(52) U.S. Cl.
CPC ................ *B64C 5/06* (2013.01); *B64C 1/12* (2013.01); *B64C 2001/0072* (2013.01); *B64D 2045/0095* (2013.01)

(58) Field of Classification Search
CPC .... B64C 3/20; B64C 3/26; B64C 5/02; B64C 5/06; F42B 10/04; F42B 10/06
See application file for complete search history.

(56) References Cited

U.S. PATENT DOCUMENTS

| H115 H | * | 8/1986 | Lorch | 244/122 AG |
| 6,045,096 A | * | 4/2000 | Rinn | B64C 3/48 |
| | | | | 244/219 |
| 2002/0011540 A1 | * | 1/2002 | De Castro Nodal | B64C 3/20 |
| | | | | 244/45 R |
| 2008/0149769 A1 | * | 6/2008 | Koch | B64C 1/10 |
| | | | | 244/121 |
| 2010/0148006 A1 | * | 6/2010 | Olmi | B64C 3/28 |
| | | | | 244/121 |
| 2013/0001356 A1 | * | 1/2013 | Llamas Sandín | B64C 1/26 |
| | | | | 244/54 |

(Continued)

FOREIGN PATENT DOCUMENTS

| EP | 1176089 | 1/2002 |
| EP | 2196391 | 6/2010 |

OTHER PUBLICATIONS

Champaign Aviation Museum, "B-17 Dorsal Fin, last few rivets being bucked", Sep. 26, 2014 https://www.youtube.com/watch?v=cq03PMR-Cio (Year: 2014).*

(Continued)

*Primary Examiner* — Philip J Bonzell
*Assistant Examiner* — Tye William Abell
(74) *Attorney, Agent, or Firm* — Greer, Burns & Crain, Ltd.

(57) ABSTRACT

An impact resistant dorsal fin structure of an aircraft comprises an upper support and ballistic material layer, wherein the ballistic material layer is configured to be joined to an aircraft fuselage and the ballistic material layer is arranged in a sliding manner around a sliding surface of the upper support.

13 Claims, 5 Drawing Sheets

(56) References Cited

U.S. PATENT DOCUMENTS

2013/0277499 A1* 10/2013 Lecerf ............... B64C 3/185
   244/123.1
2015/0344125 A1* 12/2015 Petiot ............... B64C 1/062
   244/133
2015/0353185 A1* 12/2015 Petiot ............... B32B 1/00
   244/123.6

OTHER PUBLICATIONS

European Search Report, dated May 26, 2017, priority document.

* cited by examiner

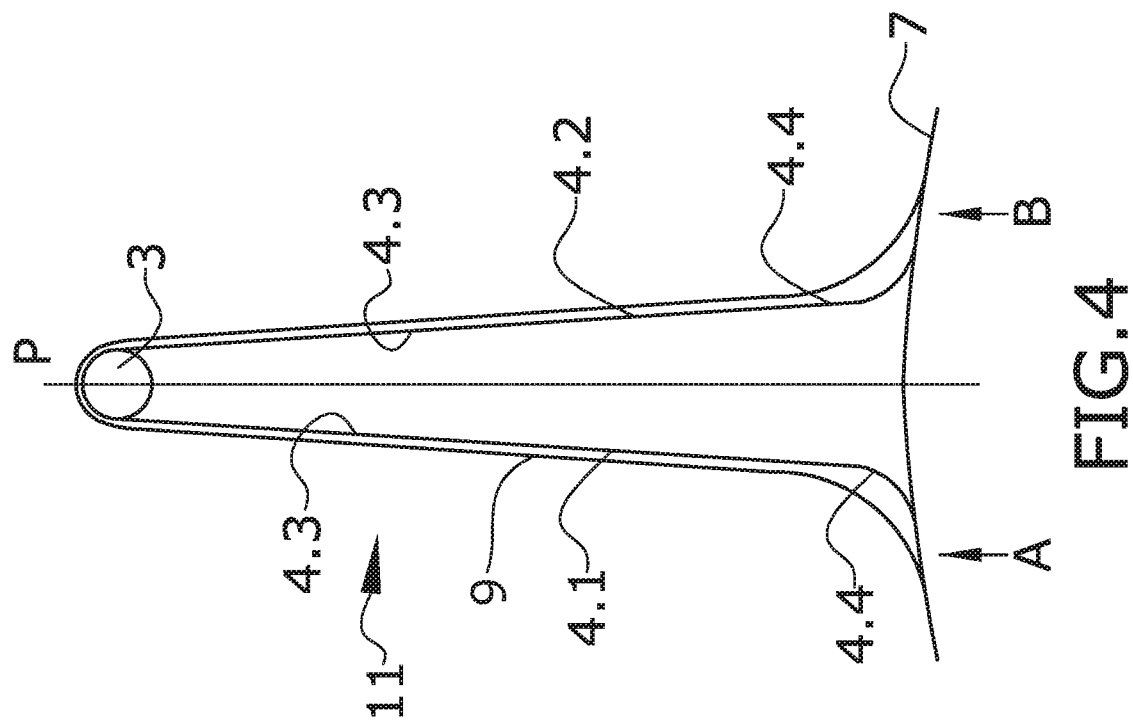
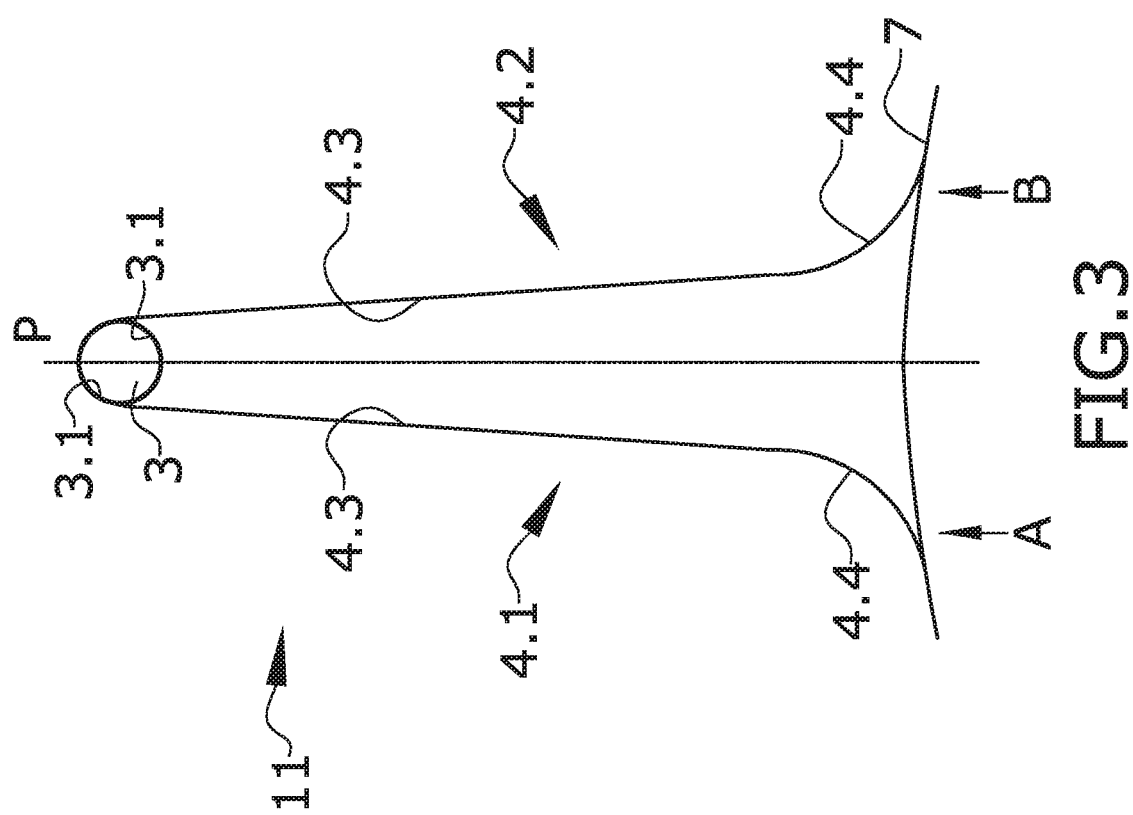

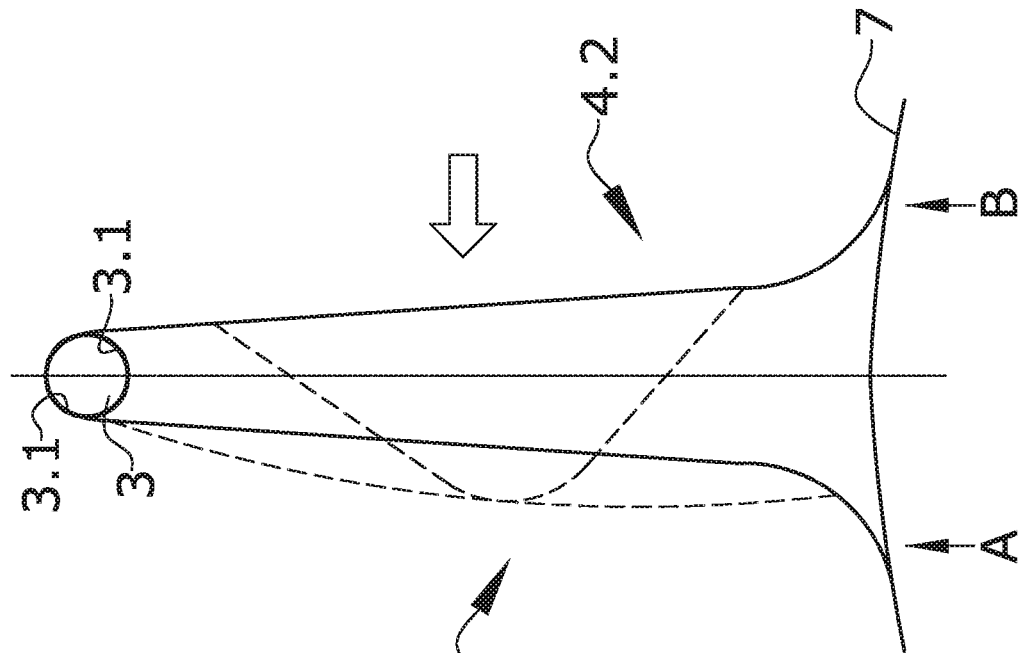
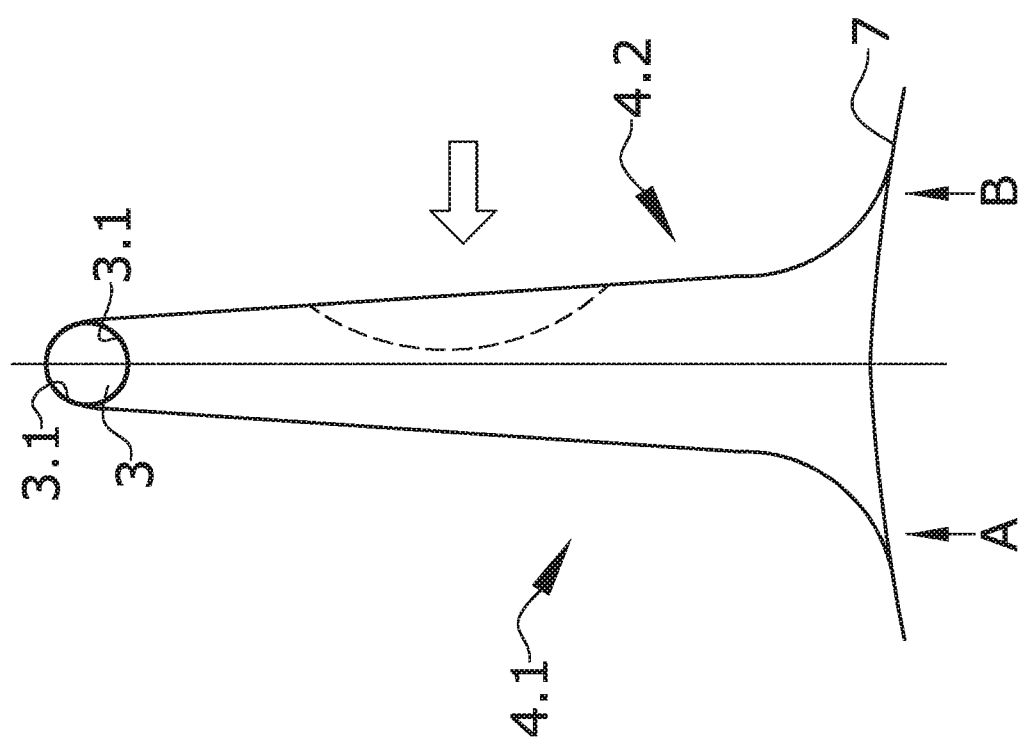

IMPACT RESISTANT DORSAL FIN

CROSS-REFERENCES TO RELATED APPLICATIONS

This application claims the benefit of the European patent application No. 16382619.1 filed on Dec. 19, 2016, the entire disclosures of which are incorporated herein by way of reference.

TECHNICAL FIELD OF THE INVENTION

The present invention belongs to the field of aircraft structures and the aircraft protection against a threat of high energy impacts, more particularly, to the field of high energy impact resistant dorsal fin structures of an aircraft.

BACKGROUND OF THE INVENTION

There are known aircraft equipped with engine configurations such as Open Rotor (OR) or Turbofan. In these aircraft, potential hazardous events may occur, such as a Propeller Blade Release (PBR) event, i.e., an event where an external blade of an engine comes off and hits the fuselage, or an Uncontained Engine Rotor Failure (UERF) event, i.e., an event where a part of the internal rotor of the engine breaks off, it is released and hits some aircraft structure, i.e., the fuselage, vertical stabilizer, horizontal stabilizer, etc., generating significant damage to these aircraft structures.

Although engine manufacturers are making efforts to reduce the probability of these failure events, experience shows that PBR and UERF events that can lead to catastrophic events continue to occur.

In the case of a Propeller Blade Release event, particular protections are applied in current aircraft, i.e., increased thickness on the aircraft fuselage, however, some studies have been performed in order to assess the carbon fiber composite thickness required by the fuselage in the potential impact area to resist such an event.

In terms of protection for UERF events, there are protections applied in order to minimize the hazards of an engine or an Auxiliary Power Unit (APU) rotor failure. Additionally, a particular protection is applied on fuel tanks if they are located in impact areas, in order to minimize the possibility of fuel cell damage. A shielding made of aluminum or titanium is typically used for these events.

As it is well known, weight is a fundamental aspect in the aeronautic industry, and therefore, there is a trend to use structures of a composite material instead of a metallic material, even for primary structures such as fuselages. The usual composite materials made of carbon fibers, compared to conventional light weight metallic materials, presents a lower impact resistance due to lower out of plane properties and damage tolerance capabilities. Also, no plasticity behavior as on metallic materials is present in composite materials and they are not able to absorb high strain energy amounts when deforming.

Depending on the threat, the most widely spread ballistic composite armors are typically composed of layers of different materials, such as metal, fabrics and ceramics or by sole fabrics of materials with good ballistic performance, also called "dry" fabrics.

Furthermore, as it is well known, the vertical stabilizer often employ a dorsal fin at its forward base which helps to increase the stall angle of the vertical surface and to prevent a phenomenon called rudder lock or rudder reversal.

The dorsal fin comprises a risk of impact area due to the PBR and UERF events. Thus, there is a need for a dorsal fin architecture capable of satisfying the safety requirements and high impact performance. In the present invention, the dorsal fin has a function of shielding the opposite engine from propeller blade release events. Therefore, it shall prevent debris from reaching the opposite engine. Adding thick shielding to structures which are not part of primary load paths is particularly inefficient as these types of structures are light, stiffness driven components.

SUMMARY OF THE INVENTION

The present invention provides an alternative solution for the aforementioned problems, with an impact resistant dorsal fin structure.

In a first inventive aspect, the invention provides an impact resistant dorsal fin structure of an aircraft being extended along a longitudinal direction X-X' and being symmetric relative to a vertical plane P including the longitudinal direction X-X', the plane P provides two sides A, B on each side of the vertical plane in the dorsal fin, the dorsal fin is adapted to be arranged on a fuselage of the aircraft and comprises, an upper support at the upper end of the dorsal fin, the upper support comprising a sliding surface, a ballistic material layer for absorbing high energy impacts, the ballistic material layer comprising a first opposite side intended for receiving impacts, the first side being arranged on the side A, a second opposite side intended for receiving impacts, the second side being arranged on the side B, and an internal surface faced to the interior of the dorsal fin, wherein the first opposite side of the ballistic material layer is adapted to be joined to the fuselage of the aircraft, and the second opposite side of the ballistic material layer is adapted to be joined to the fuselage of the aircraft, and the internal surface of the ballistic material is in contact with the sliding surface of the upper support, and the ballistic material layer is arranged in a sliding manner around the sliding surface of the upper support.

Throughout this entire document, "longitudinal direction X-X'" will be understood as the direction that the longitudinal axis of an aircraft comprises. Also, the longitudinal direction will be understood as the direction from the aircraft tail's cone to the nose.

The "vertical plane P" will be understood as a vertical plane that includes the longitudinal direction X-X' and divides the dorsal fin into two equal parts. The equal parts correspond respectively to the sides A, B of the dorsal fin, being the sides A, B opposite each other.

The dorsal fin of the present invention is understood as a structural part of the aircraft, which is a secondary structure of an aircraft. The dorsal fin connects a vertical stabilizer of the aircraft with the fuselage of the aircraft. Considering the aircraft stationed on the ground, the dorsal fin structure and the vertical stabilizer are located on the upper zone of the aircraft, as it is commonly known.

Since the dorsal fin is arranged on the aircraft fuselage, such fuselage is also symmetric relative to the vertical plane P. Thus, the ballistic material layer is adapted to be joined to the fuselage at both sides A, B which the vertical plane P provided.

Throughout this entire document, "upper'" will be understood as a referenced zone of the dorsal fin which is the furthest from the aircraft fuselage. In particular, the "upper support" will be understood as a structural support of the dorsal fin which is located at the upper end of the dorsal fin, being the upper end, the end of the dorsal fin that is the furthest from the aircraft fuselage.

Furthermore, "lower" will be understood as a referenced zone of the dorsal fin which is the closet to the aircraft fuselage. In particular, "lower connecting line" will be understood as a connecting line that is located closer to the aircraft fuselage, or located on the aircraft fuselage.

Throughout this entire document, "front'" will be understood as a referenced zone of the dorsal fin which is the closest to the aircraft nose. Additionally, throughout this entire document, "rear'" will be understood as a referenced zone of the dorsal fin which is the closest to the aircraft tail's cone than to the aircraft nose.

The dorsal fin structure has a main rigid structure which comprises two structural frames, an upper support or axis, and some stiffening components. Additionally, the dorsal fin structure comprises a ballistic material layer, thus, the ballistic material layer comprises two opposite sides intended for receiving impacts in such a way that each opposite side is arranged on the sides A, B respectively.

In a particular embodiment, the ballistic material layer is adapted for being part of the skin of the dorsal fin, in such a way that the ballistic material layer will be stiffened, i.e., a ballistic material layer with stiffeners, or the ballistic material layer being part of a composite laminate as a sandwich panel.

Advantageously, the application of a ballistic material as a layer on the dorsal fin structure provides a lightweight and resistant shield for impact protection.

Furthermore, advantageously, the rigid structure of the dorsal fin, the sliding surface of the upper support and the lower connecting lines, cooperate with the ballistic material layer for absorbing high energy impacts, in such a way that in case of impact, the ballistic material layer, being fixed at the lower connecting lines, slides around the sliding surface of the upper support allowing high deflections of the ballistic layer. Additionally, due to the fact that the rigid structure of the dorsal fin works with the ballistic material layer, the present impact resistant dorsal fin structure provides additional energy absorption capability by friction between the internal surface of the ballistic material layer and the sliding surface of the upper support.

In a particular embodiment, the ballistic material layer is at least a layer comprising dry high strength and high deformation fibers, wherein dry fibers are those fibers free of resin or with a small amount of resin, such as the small amount of resin allows fibers to elongate under impact without a cross-interference between them.

Throughout this entire document, "dry fiber" will be understood as fibers of a fabric material, being the fibers, embedded in a resin matrix with a lower amount of resin, or without any resin matrix content. Thus, the lower amount of resin the fabric has (the more "dry" the fibers are), and advantageously, a better behavior against impact is achieved, as the deformation of a dry fiber during the impact does not prevent the deformation of the surrounding fibers.

Advantageously, the fabric with dry fibers provides a material with high strength and deformation capabilities as it has no restriction and can work free as a membrane.

In a particular embodiment, dry fibers are aramids such as, e.g., Kevlar and Twaron; ultra-high molecular weight Polyethylene (UHMWPEs) such as, e.g., Dyneema; Polypropylene such as, e.g., Innegra, etc.

In a particular embodiment, the ballistic material layer further comprises an external surface intended for receiving the impact.

In a particular embodiment, the first opposite side of the ballistic material layer comprises a first connecting line, and the second opposite side of the ballistic material layer comprises a second connecting line, in such a way that the ballistic material layer is adapted to be joined to the fuselage by such connecting lines.

Throughout this entire document, "connecting line" will be understood as a line or an interface which acts as a link between the ballistic material layer and a structural part of the fuselage aircraft. Also, the connecting line will be understood as a longitudinal region of the ballistic material layer by which the ballistic material layer is joined to the aircraft fuselage.

In a particular embodiment, the first and second connecting lines are arranged at the opposite ends of the ballistic material layer.

In another particular embodiment, the connecting line is a strip which comprises joining means, e.g., welding, adhesive.

In a particular embodiment, the impact resistant dorsal fin structure further comprises two frames. These two frames, a front frame and a rear frame, are part of the rigid structure of the dorsal fin. Furthermore, the front frame and the rear frame are adapted to support the ballistic material layer and the upper support. In a more particular embodiment, the front frame comprises a substantially planar edge, and the rear frame comprises a substantially planar edge.

Such two main structural frames provide support for the upper support, and the ballistic material layer is resting on the upper support allowing relative movement, which is rotation around the upper support, with friction.

Advantageously, the presence of the two frames provides greater stability to the dorsal fin structure, and allows for both connecting lines to be in contact with the upper support.

In a particular embodiment, the ballistic material comprises front connecting lines and rear connecting lines, in such a way that the ballistic material layer is joined to each front and rear frame by such connecting lines. In a more particular embodiment, the front and rear connecting lines are arranged at the front and rear end of the ballistic material layer.

In a particular embodiment, the front edge and rear edge of the front and rear frame, respectively, comprise intermediate portions, respectively, which are intended for the ballistic material layer to slide over the intermediate portions, and wherein the intermediate portions are at the upper end of each front and rear frame, respectively.

In a particular embodiment, the ballistic material is joined to the front edge and rear edge of the front and rear frame, respectively, avoiding the joint between the ballistic material and the intermediates portions, in such a way that the ballistic material layer is allowed to slide around the intermediate portions.

Advantageously, the joining between the ballistic material layer and the frames of the dorsal fin structure, allows the ballistic material layer to behave like a tensioned membrane which, in case a very high impact occurs, causes the tearing of the joints.

In a particular embodiment, the joint between the ballistic material layer and the fuselage of the aircraft are tearable joints. Additionally, the joint between the ballistic material layer and the front edge of the front frame, the joint between the ballistic material layer and the rear edge of the rear frame or both joints are tearable joints.

Throughout this entire document, "tearable joint" will be understood as a joint which, due to an impact, may cause the ballistic material layer to tear down the connecting lines so that the ballistic material layer is torn.

In a more particular embodiment, the tearable joint is a progressively tearable joint in such a way that, advantageously, the joint allows the ballistic material layer to easily tear from the frames of the dorsal fin structure, or from the fuselage of the aircraft. Additionally, in case an impact occurs and the ballistic material layer tears down, the fuselage or frames material is not damaged.

In a more particular embodiment, the tearable joint is a line of fuse rivets.

Throughout this entire document, "fuse rivet" will be understood as a joint which comprises rivets or fasteners weaker than the joined materials, which are the ballistic material layer and the aircraft fuselage or the dorsal fin frames.

In a particular embodiment, the front frame, the rear frame and the ballistic material layer define a closed space.

In a particular embodiment, the impact resistant dorsal fin further comprises a free space between the first opposite side and second opposite side of the ballistic material layer, such that the internal surface of one opposite side is adapted to contact with the internal surface of the opposite side if the ballistic material layer is under high strain due to an impact. Advantageously, from the moment that an impact occurs, both sides of the ballistic material layer react in tension, in opposite directions around the upper support.

Throughout this entire document, "free space" will be understood as a space which is free of being in contact with other structural elements of the dorsal fin structure.

Due to an impact on the first opposite side of the ballistic material layer, advantageously, if the impact reaches the second opposite side, the second opposite side of the ballistic material layer reacts in a similar manner as the first side of the ballistic material layer. Also advantageously, due to the configuration of the present dorsal fin structure, the second opposite side of the ballistic material layer counteracts the load created by the first opposite side of the ballistic material layer due to the link between both opposite sides through the sliding surface of the upper support allowing the transfer of load from one opposite side to the other opposite side. This same would apply on the first opposite side of the ballistic material layer if the impact occurs on the second opposite side.

In a particular embodiment, the impact resistant dorsal fin structure further comprises a rib located around the ballistic material layer leaving a free space between itself and the ballistic material layer. Such rib is adapted to be joined to the aircraft fuselage. In a particular embodiment, the rib is a closing rib which is not in contact with the ballistic material layer prior to an impact, in such a way that the rib is arranged at both first and second sides. This rib is intended for receiving impacts, thus, such rib also participates in absorbing high energy impacts.

The closing rib is located in the present dorsal fin in such a way that a free space is provided between the ballistic material layer and the rib. Thus, when an impact occurs on the dorsal fin, the closing rib is affected by the impact and absorbs impact energy in such a way that the closing rib comes in contact with the ballistic material layer so that, advantageously, the ballistic material layer also participates in impact energy absorption.

Additionally, the appearance of the closing rib on the present dorsal fin, advantageously, enables a complete pre-assembly of the dorsal fin before being assembled to the fuselage of the aircraft.

In a more particular embodiment, the rib is made of composite material. In another particular embodiment, the rib is made of metal.

In a particular embodiment, the impact dorsal fin structure further comprises an aerodynamic surface located around the ballistic material layer leaving free space between itself and the ballistic material layer. In a more particular embodiment, the aerodynamic surface is adapted to be joined to the aircraft fuselage.

Advantageously, the appearance of the aerodynamic surface helps the ballistic material layer to absorb part of the impact energy. Thus, the aerodynamic surface is also intended to receive impacts.

In a particular embodiment, the ballistic material layer is under stress before the impact occurs.

In a particular embodiment, the impact dorsal fin further comprises a sandwich structure panel which is joined to the ballistic material layer by the external surface of such ballistic material layer, in such a way that the ballistic material layer is part of the sandwich structure panel. That is, according to this embodiment, the ballistic material layer is an additional layer of the sandwich structure panel.

Advantageously, the ballistic material layer being part of a sandwich structure panel allows both to work together in absorbing impact energy.

In a second inventive aspect, the invention provides an aircraft comprising a dorsal fin structure according to the first inventive aspect, wherein the dorsal fin is joined to the fuselage of the aircraft and also to a vertical stabilizer.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

FIG. 3 shows a cross sectional view of a dorsal fin structure according to an embodiment of the present invention.

FIG. 4 shows a cross sectional view of a dorsal fin structure according to an embodiment of the present invention.

FIG. 5 shows a cross sectional view of a dorsal fin structure when an impact occurs according to an embodiment of the present invention.

FIG. 6 shows a cross sectional view of a dorsal fin structure when an impact occurs according to an embodiment of the present invention.

DETAILED DESCRIPTION OF THE PREFERRED EMBODIMENTS

Figure 1:
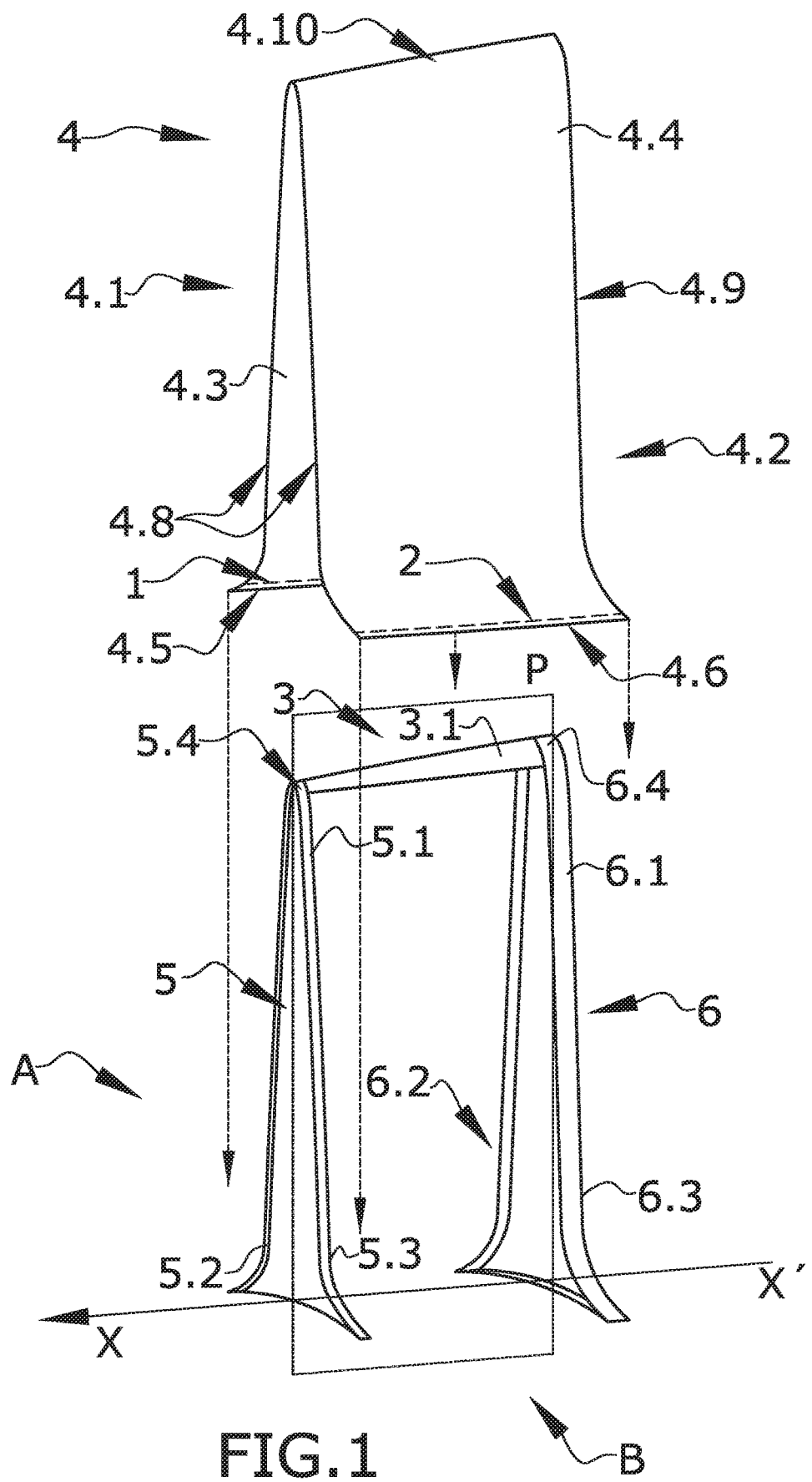
FIG. 1 shows an exploded view of a dorsal fin structure according to an embodiment of the present invention.

FIG. 1 shows an exploded view of a dorsal fin (11) structure of the present invention, illustrating the relationship between a ballistic material layer (4) and a main rigid structure. In this particular example, the main rigid structure of the dorsal fin (11) comprises a front frame (5), a rear frame (6) and an upper support (3). The dorsal fin (11) of the present invention acts as an aerodynamic surface.

The dorsal fin (11) is extended along the longitudinal direction X-X', and is symmetric relative to the vertical plane P which includes the longitudinal direction X-X'. The vertical plane P provides two sides A, B on each side of the vertical plane P in the dorsal fin (11).

At the top of the FIG. 1 can be seen the ballistic material layer (4), which is provided for absorbing the energy of an impact, with the shape with which the ballistic layer (4) will be arranged on the main rigid structure.

The ballistic material layer (4) comprises an internal surface (4.3) intended to be faced to the interior of the dorsal fin (11), and an external surface (4.4) intended to be faced outward of the dorsal fin (11) structure. The internal surface (4.3) and the external surface (4.4) are both located on both sides A, B. The ballistic material layer (4) further comprises a first opposite side (4.1) arranged on the side A, and a second opposite side (4.2) arranged on the side B, in such a way that the ballistic material layer (4) is divided in the two opposite sides (4.1, 4.2) by the vertical plane P. Each opposite side (4.1, 4.2) comprises such internal surface (4.3) and external (4.4).

The first opposite side (4.1) comprises a first opposite end (4.5), and the second opposite side (4.2) comprises a second opposite end (4.6).

The ballistic material layer (4) further comprises a front end (4.8) arranged on both sides A, B; and a rear end (4.9) arranged also on both sides A, B. The ballistic material layer (4) also comprises an intermediate portion (4.10) that is intended for slide around the sliding surface (3.1) of the upper support (3).

In this particular example, the ballistic material layer (4) comprises a first connecting line (1) arranged closer to the first opposite end (4.5), and a second connecting line (2) arranged closer to the second opposite end (4.6). Thus, the ballistic material layer (4) is adapted to be joined to the fuselage (7) by the connecting lines (1, 2).

In the bottom of FIG. 1 can be seen a dorsal fin (11) comprising the front frame (5), the rear frame (6) and the upper support (3) which is attached between both frames (5, 6). Both frames (5, 6) are arranged on both sides A, B.

The front frame (5) comprises substantially a planar edge (5.1) which is distributed along the ends of the frame (5). Furthermore, the rear frame (6) comprises substantially a planar edge (6.1) which is distributed along the ends the frame (6).

The front edge (5.1) of the front frame (5) comprises a first portion (5.2) arranged on side A, and a second portion (5.3) arranged on side B. The two portions (5.2, 5.3) of the front edge (5.1) are separated by an intermediate portion (5.4).

The rear edge (6.1) of the rear frame (6) comprises a first portion (6.2) arranged on side A, and a second portion (6.3) arranged on side B. The two portions (6.2, 6.3) of the rear edge (6.1) are separated by an intermediate portion (6.4).

The upper support (3) is located at the upper end of the dorsal fin (11) and comprises a sliding surface (3.1) which allows the ballistic material layer (4) to slide around the sliding surface (3.1). Additionally, the upper support (3) is extended along the longitudinal direction X-X' and in this embodiment, it is symmetrical relative to the vertical plane P, in such a way that the upper support (3) is located on both sides A, B of the dorsal fin (11).

Both intermediate portions (5.4, 6.4) of each frame (5, 6) respectively are coincident with the upper support (3), in such a way that the sliding surface (3.1) and both intermediate portions (5.4, 6.4) allow the ballistic material layer (4) to slide around them.

As it can be seen on FIG. 1, the first connecting line (1) and second connecting line (2) of the ballistic material layer (4) are intended to be respectively joined to the fuselage (7) of the aircraft (10), and first and second opposite sides (4.1, 4.2).

Additionally, the ballistic material layer (4) is intended to be respectively joined to the front frame (5) and rear frame (6). In a particular example (not shown), the ballistic material layer (4) comprises a front connecting line and rear connecting line by which the ballistic material layer (4) is joined to the front frame (5) and rear frame (6) respectively, in such a way that the intermediate portions (4.10) of the ballistic material layer (4) are free of joining. Thus, the intermediate portion (4.10) of the ballistic material layer (4) are intended to be in contact with the intermediate portions (5.4, 6.4) of the front and rear frame (5, 6) respectively.

Figure 2:
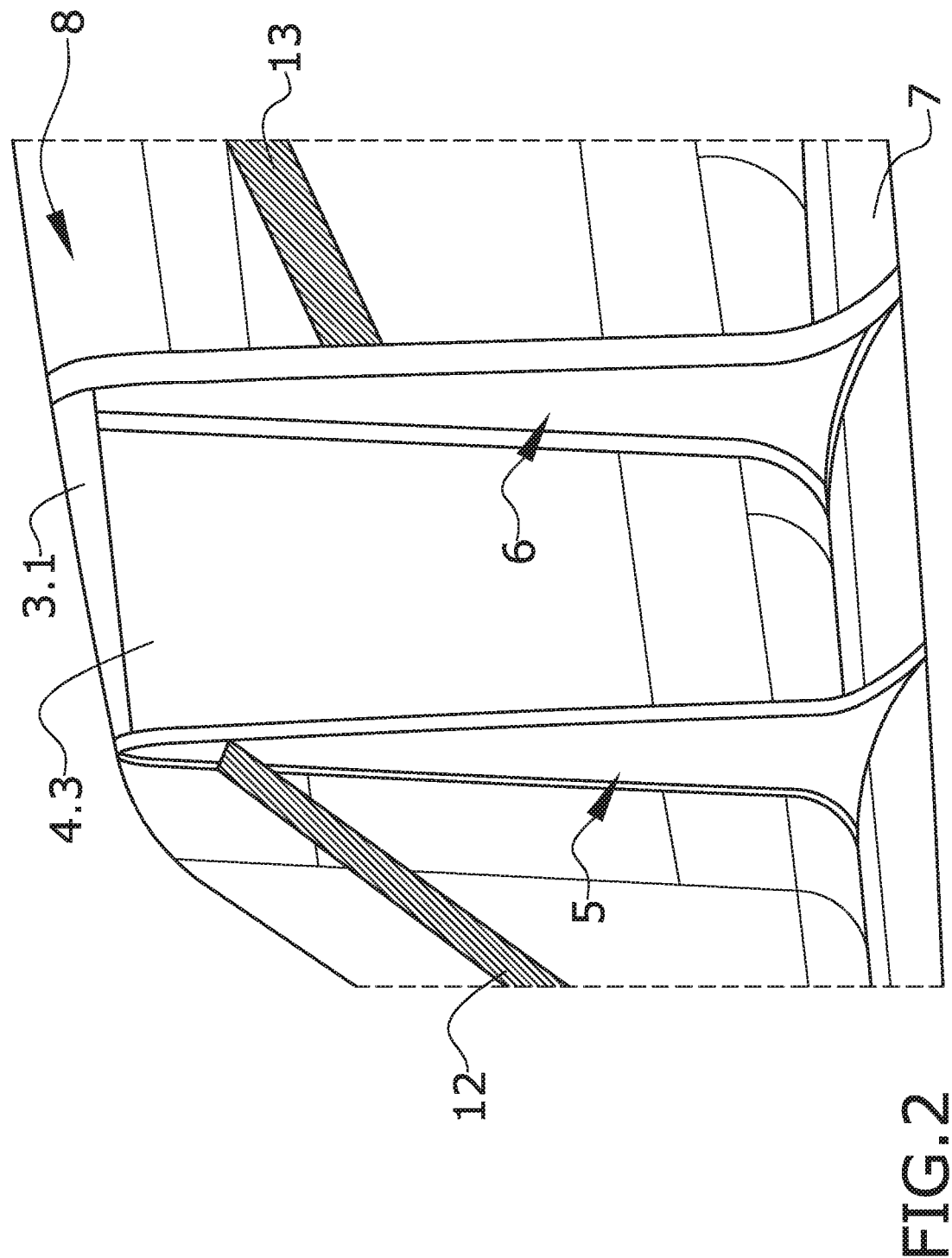
FIG. 2 shows a perspective view of a dorsal fin structure according to an embodiment of the present invention.

The FIG. 2 shows a perspective view of a dorsal fin (11) structure illustrating the relationship between the dorsal fin (11) structure and the fuselage (7) of an aircraft (10). The dorsal fin (11) structure comprising frames (5, 6), upper support (3) and a skin (8) which is part of the rigid structure of the dorsal fin (11); and the fuselage (7) of the aircraft (10) comprising joining means (not shown).

Also in this FIG. 2 can be seen the front frame (5) and the rear frame (6) joined to the fuselage (7), and also joined to the rest of the structure of the dorsal fin (11) by stiffening components (12, 13).

FIG. 2 also shows how the first opposite side (4.1) of the ballistic material layer (4) is arranged on the side A of the dorsal fin (11), and how the first opposite side (4.1) is joined to the fuselage (7) and to the front and rear frames (5, 6).

FIG. 3 shows schematically a cross sectional view of the dorsal fin (11) structure of the present invention and illustrates the relationship between the dorsal fin (11) and the fuselage (7) of an aircraft.

FIG. 3 also shows the opposite sides (4.1, 4.2) of the ballistic material layer (4) distributed respectively on the sides A, B; both opposite sides attached to the fuselage (7) of the aircraft (10), and the ballistic material layer (4) being symmetrically relative to the vertical plane P. The upper support (3) is also shown being in contact with the ballistic material layer (4) by the sliding surface (3.1) of the upper support (3). Also, a free space can be seen between both opposite sides (4.1, 4.2) of the ballistic material layer (4), thus the internal surface (4.3) of the ballistic material layer (4) is in contact with the sliding surface (3.1) of the upper support (3). Furthermore, it is shown how the external surface (4.4) of the ballistic material layer (4) is faced outward the dorsal fin (11) structure.

FIG. 4 shows schematically a particular embodiment wherein the dorsal fin (11) structure further comprises an aerodynamic surface (9) being symmetrical relative to the vertical plane P. The aerodynamic surface (9) is located around the ballistic material layer (4), and is arranged on both sides A, B of the dorsal fin (11) structure.

In this particular example, the aerodynamic surface (9) is attached to the fuselage (7) of the aircraft (10). The aerodynamic skin (9) is also joined to the upper support (3) by fixing means (not shown), in such a way that the joint allows the ballistic material layer (4) to slide around the upper support (3).

In a more particular example, the aerodynamic surface (9) is made of carbon fiber reinforcement plastic (CFRP) or metallic; for example, aluminum.

The FIGS. 5 and 6 show schematically the behavior of the ballistic material layer (4) when an impact occurs on the side B of the dorsal fin (11) structure. Also, a free space can be seen between the opposite sides (4.1, 4.2) of the ballistic material layer.

When an impact occurs on the second opposite side (4.2) of the ballistic material layer (4), the skin (8) of the dorsal fin (11) structure is broken (not shown), and progressively the impact reaches the ballistic material layer (4). Thus, when the impact occurs on the side (4.2) of the ballistic material layer (4), the side (4.2) works as a membrane absorbing most of the impact energy.

Furthermore, some impact energy is absorbed by friction between the ballistic material layer (4) and the upper support (3) because of the friction between the sliding surface (3.1) of the upper support (3) and the internal surface (4.3) of the ballistic material layer (4).

In a particular example, when the impact energy is high, some fuse rivets located along the ballistic material layer (4) and joined to the fuselage (7) are pulled-off, absorbing at least part of the impact energy. The same would occur to the fuse rivets located along the ballistic material layer (4) and joined to the frames (5, 6).

The portion of the ballistic material layer (4) affected by the impact is progressively deflected, or even deformed, inward of the dorsal fin (11) and also towards the first opposite side (4.1) of the ballistic material layer (4).

In the particular example shown on FIG. 5, the impact occurring on the second side (4.2) causes the second side (4.2) to be deformed without reaching the first side (4.1) of the ballistic material layer (4).

In the particular example shown in FIG. 6, the impact occurring on the second side (4.2) causes the second side (4.2) to be deformed up to contact with the opposite side (4.1) of the ballistic material layer (4). In this particular case, the impact energy is partially absorbed because of the friction between the sliding surface (3.1) of the upper support (3) and the internal surface (4.3) of the ballistic material layer (4) and the deformation of the ballistic material layer (4). Thus, the ballistic material layer (4) suffers an elastic deformation under tension in both sides (4.1, 4.2).

Figure 7:
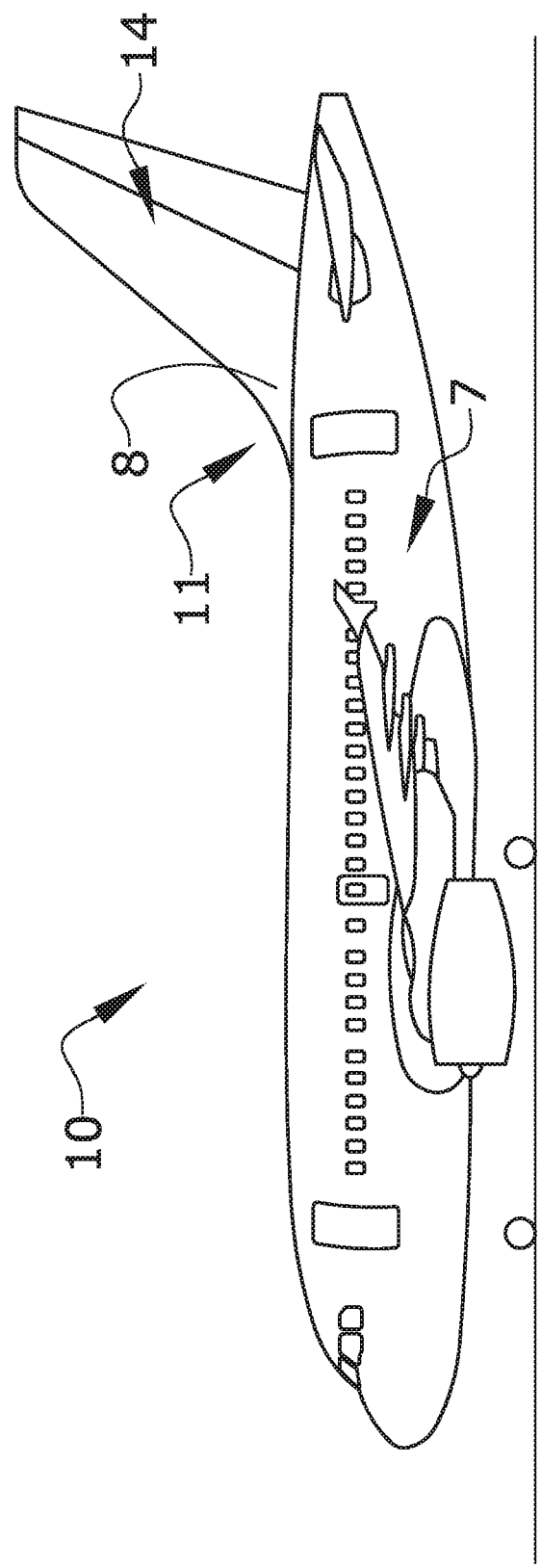
FIG. 7 shows a perspective view of an aircraft comprising a dorsal fin structure according to the present invention.

FIG. 7 shows an aircraft (10) comprising a dorsal fin (11) according to the present invention. As it can be seen, the dorsal fin (11) is joined to the aircraft fuselage (7) and is joined to the vertical stabilizer (14) of the aircraft (10).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An impact resistant dorsal fin structure of an aircraft extending along a longitudinal direction and being symmetric relative to a vertical plane along the longitudinal direction, the vertical plane defining first and second opposite sides of the dorsal fin, said dorsal fin being configured to be arranged on a fuselage of the aircraft and comprising:
   an upper support at an upper end of the dorsal fin, the upper support comprising a sliding surface,
   a ballistic material layer to absorb high energy impacts, the ballistic material layer comprising:
      a first opposite side configured to receive impacts, said first side being arranged on the first side of the dorsal fin,
      a second opposite side configured to receive impacts, said second side being arranged on the second side of the dorsal fin, and
      an internal surface facing an interior of the dorsal fin,
   a front frame, and
   a rear frame,
   wherein
   the front frame and the rear frame support the ballistic material layer and the upper support,
   the first opposite side of the ballistic material layer is configured to be joined at a joint to the fuselage of the aircraft, and the second opposite side of the ballistic material layer is configured to be joined to the fuselage of the aircraft, and
   the internal surface of the ballistic material layer is in contact with the sliding surface of the upper support, and said ballistic material layer is arranged in a sliding manner around the sliding surface of the upper support.

2. The impact resistant dorsal fin structure according to claim 1, wherein the front frame, the rear frame and the ballistic material layer define a closed space.

3. The impact resistant dorsal fin structure according to claim 1, further comprising a free space between the first opposite side and second opposite side of the ballistic material layer, wherein an internal surface of one opposite side is configured to contact with an internal surface of the opposite side if the ballistic material layer is under high strain due to an impact.

4. The impact resistant dorsal fin structure according to claim 1, further comprising an aerodynamic surface located around the ballistic material layer leaving a free space between itself and said ballistic material layer, the aerodynamic surface being configured to be joined to the aircraft fuselage.

5. The impact resistant dorsal fin structure according to claim 1, wherein the front frame and the rear frame each comprise a planar edge portion.

6. The impact resistant dorsal fin structure according to claim 1, wherein the first opposite side of the ballistic material layer comprises a first connecting line, and the second opposite side of the ballistic material layer comprises a second connecting line, wherein the ballistic material layer is configured to be joined to the fuselage by such connecting lines.

7. The impact resistant dorsal fin structure according to claim 1, wherein the ballistic material layer comprises an external surface configured to receive the impacts.

8. The impact resistant dorsal fin structure according to claim 7, further comprising a sandwich structure panel which is joined to the ballistic material layer at the external surface of the ballistic material layer.

9. The impact resistant dorsal fin structure according to claim 1, wherein the front edge and rear edge of the front and rear frame, respectively, comprise an intermediate portion, respectively, which are configured for the ballistic material layer to slide over the intermediate portions, and wherein said intermediate portions are an upper end of each front and rear frame, respectively.

10. The impact resistant dorsal fin structure according to claim 9, wherein the ballistic material is joined at a joint to the front edge and rear edge of the front and rear frame, respectively, avoiding a joint between said ballistic material and the intermediate portions, such that said ballistic material layer is also arranged in a sliding manner around the intermediate portions of the frames, respectively.

11. The impact resistant dorsal fin structure according to claim 10, further comprising at least one of:
    the joint between the ballistic material layer and the fuselage of the aircraft is a tearable joint, or
    the joint between the ballistic material layer and the front and rear edges of the front and rear frame, respectively, are tearable joints.

12. The impact resistant dorsal fin structure according to claim 11, wherein at least one of the tearable joints comprises a line of fuse rivets.

13. An aircraft comprising a dorsal fin structure according to claim 1, wherein said dorsal fin is joined to the fuselage of the aircraft and also to a vertical stabilizer.

\* \* \* \* \*